(12) United States Patent
Seo

(10) Patent No.: US 11,440,290 B2
(45) Date of Patent: Sep. 13, 2022

(54) WATERPROOF SOUND-TRANSMITTING SHEET FOR FACILITATING VISION INSPECTION

(71) Applicant: AMOGREENTECH CO., LTD., Gimpo-si (KR)

(72) Inventor: Inyong Seo, Seoul (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 0 days.

(21) Appl. No.: 17/295,825

(22) PCT Filed: Nov. 22, 2019

(86) PCT No.: PCT/KR2019/016111
§ 371 (c)(1),
(2) Date: May 20, 2021

(87) PCT Pub. No.: WO2020/106094
PCT Pub. Date: May 28, 2020

(65) Prior Publication Data
US 2022/0088902 A1   Mar. 24, 2022

(30) Foreign Application Priority Data

Nov. 22, 2018   (KR) .......................... 10-2018-0145733

(51) Int. Cl.
*B32B 7/023*   (2019.01)
*B32B 5/26*    (2006.01)
(Continued)

(52) U.S. Cl.
CPC .............. *B32B 7/023* (2019.01); *B32B 5/022* (2013.01); *B32B 5/267* (2021.05); *D01F 1/04* (2013.01);
(Continued)

(58) Field of Classification Search
CPC ......... B32B 7/023; B32B 5/022; B32B 5/267; B32B 2305/026; B32B 2262/0238;
(Continued)

(56) References Cited

U.S. PATENT DOCUMENTS 8,272,517 B2   9/2012 Horie et al.
9,463,607 B2   10/2016 Lee et al.
(Continued)

FOREIGN PATENT DOCUMENTS

KR   10-2011-0063492 A   6/2011
KR   10-2013-0129104 A   11/2013
(Continued)

OTHER PUBLICATIONS

KR Office Action dated Feb. 20, 2021 as received in Application No. 10-2019-0151233.
(Continued)

*Primary Examiner* — Hai Vo
(74) *Attorney, Agent, or Firm* — Maschoff Brennan

(57) ABSTRACT

Disclosed is a waterproof sound-transmitting sheet for facilitating a visual inspection, which radiates a polymer material in a state of blending a pigment to form a waterproof layer having an achromatic color, thereby facilitating a vision inspection, and improving a water repellence even while making the waterproof sound-transmitting sheet thin and light. The disclosed waterproof sound-transmitting sheet for facilitating the visual inspection includes an acoustic layer interposed between an upper waterproof layer and a lower waterproof layer, and at least one of the upper waterproof layer and the lower waterproof layer is composed of a porous colored membrane having a color.

9 Claims, 5 Drawing Sheets

(51) Int. Cl.
*B32B 5/02* (2006.01)
*D01F 1/04* (2006.01)
*D04H 1/728* (2012.01)

(52) U.S. Cl.
CPC .......... *D04H 1/728* (2013.01); *B32B 2250/03* (2013.01); *B32B 2250/24* (2013.01); *B32B 2250/40* (2013.01); *B32B 2255/02* (2013.01); *B32B 2262/0238* (2013.01); *B32B 2262/0292* (2013.01); *B32B 2305/026* (2013.01); *B32B 2307/10* (2013.01); *B32B 2307/4026* (2013.01); *B32B 2307/7265* (2013.01)

(58) Field of Classification Search
CPC ........ B32B 2262/0292; B32B 2307/10; B32B 2307/4026; B32B 2307/7265
See application file for complete search history.

(56) References Cited

U.S. PATENT DOCUMENTS

| | | | |
|---|---|---|---|
| 9,510,075 B2 | 11/2016 | Seo et al. | |
| 10,132,004 B2 | 11/2018 | Lee et al. | |
| 10,170,097 B2 | 1/2019 | Seo et al. | |
| 2014/0332310 A1 | 11/2014 | Seo et al. | |
| 2015/0070842 A1* | 3/2015 | Lee ............. | B32B 7/12 264/484 |
| 2015/0071472 A1* | 3/2015 | Lee ............. | D01F 1/04 381/334 |
| 2016/0075838 A1* | 3/2016 | Watanabe ...... | D04H 1/43838 521/55 |
| 2017/0292000 A1* | 10/2017 | Furuyama ........ | B25J 15/0691 |

FOREIGN PATENT DOCUMENTS

| | | |
|---|---|---|
| KR | 10-2013-0129105 A | 11/2013 |
| KR | 10-2014-0075629 A | 6/2014 |
| KR | 10-2014-0075632 A | 6/2014 |
| KR | 10-1721993 B1 | 3/2017 |
| KR | 10-1812787 B1 | 12/2017 |

OTHER PUBLICATIONS

Indian Office Action dated Nov. 10, 2021 as received in application No. 202117022120.

* cited by examiner

[FIG. 1]
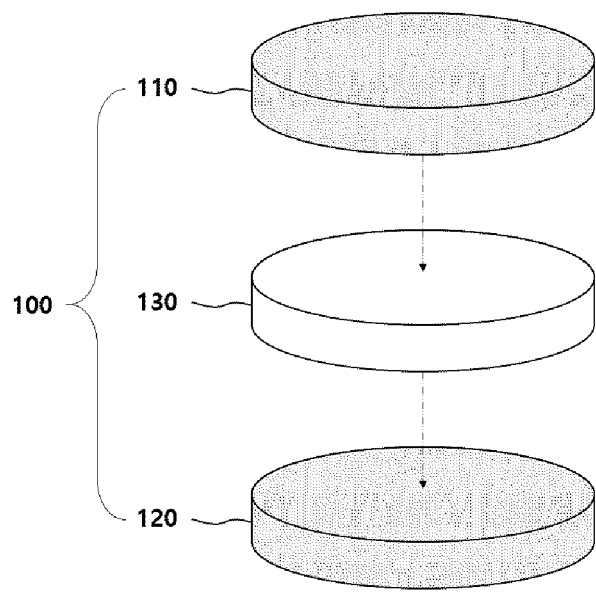
[FIG. 2]
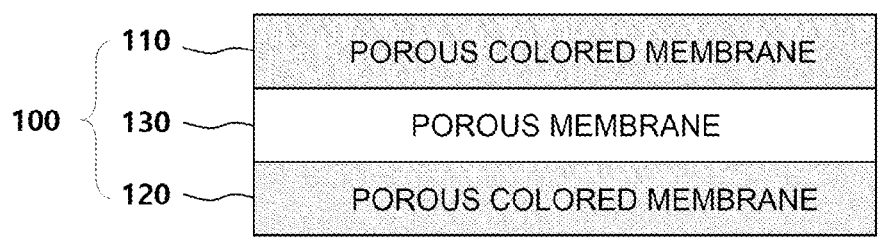

[FIG. 3]
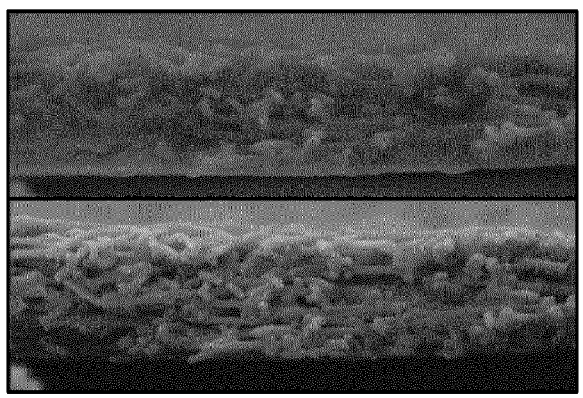
[FIG. 4]
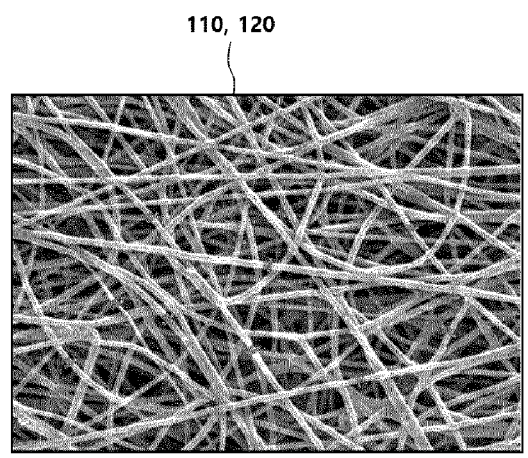

[FIG. 5]
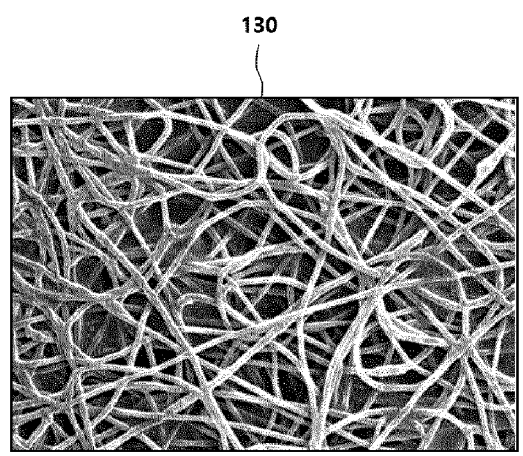

[FIG. 6]

| Item | PRESENT DISCLOSURE | CONVENTION |
|---|---|---|
| Average Angle | 138.82 | 133.87 |
| Left Angle | 139.20 | 134.12 |
| Right Angle | 138.44 | 133.61 |
| Drop Volume | 7.62 uL | 7.19 uL |

[FIG. 7]

| Items | Water Pressure Resistance 0.5 bar | Water Pressure Resistance 0.55 bar | Water Pressure Resistance 0.6 bar | Water Pressure Resistance 0.65 bar | Water Pressure Resistance 0.7 bar |
|---|---|---|---|---|---|
| PRESENT DISCLOSURE | PASS | PASS | PASS | PASS | LEAK |
| CONVENTION | PASS | PASS | LEAK | LEAK | LEAK |

WATERPROOF SOUND-TRANSMITTING SHEET FOR FACILITATING VISION INSPECTION

TECHNICAL FIELD

The present disclosure relates to a waterproof sound-transmitting sheet, and more specifically, to a waterproof sound-transmitting sheet for facilitating a vision inspection for reading defects due to foreign matters and wrinkles.

BACKGROUND ART

Recently, the use of a mobile electronic device such as a portable terminal, a digital camera, or a notebook computer is increasing day by day. Since such a mobile electronic device is used while carrying, the mobile electronic device is likely to fall into water, thereby requiring a waterproof function. That is, a portion where a speaker, a microphone, or the like is installed is formed with an acoustic hole for emitting sound, and water or dust permeates into the electronic device through the acoustic hole.

Therefore, the acoustic hole is installed with a waterproof sound-transmitting sheet for passing through sound and blocking water or dust. Such a waterproof sound-transmitting sheet should be manufactured in consideration of all of waterproof and sound transmission efficiency.

Defects of a product such as whether foreign matters such as pinhole and dust exist and wrinkles should be read by a vision inspection after the waterproof sound-transmitting sheet is manufactured, in which the waterproof sound-transmitting sheet is mainly manufactured in white, such that there is a problem in that it is difficult to read foreign matters and wrinkles through the vision inspection.

SUMMARY OF INVENTION

Technical Problem

The present disclosure is proposed to solve the above conventional problem, and an object of the present disclosure is to provide a waterproof sound-transmitting sheet for facilitating a vision inspection, which radiates a polymer material and a pigment in a blended state to form a waterproof layer having a color, thereby facilitating the vision inspection, and improving water repellency even while making the waterproof sound-transmitting sheet thin and light.

Solution to Problem

To achieve the object, a waterproof sound-transmitting sheet for facilitating a vision inspection according to an exemplary embodiment of the present disclosure includes an upper waterproof layer composed of a porous membrane, a lower waterproof layer composed of the porous membrane and disposed under the upper waterproof layer, and an acoustic layer composed of the porous membrane and interposed between the upper waterproof layer and the lower waterproof layer, in which the porous membrane of at least one of the upper waterproof layer and the lower waterproof layer is a porous colored membrane having a color other than white and black.

At this time, the porous colored membrane may be an achromatic color other than white and black, and for example, is gray.

The porous colored membrane may be formed by electrospinning a mixture of a pigment and a polymer material, and a color of the pigment may be one of black and white. A rate of adding the pigment is 0.5 wt % or more and 5 wt % or less based on the mixture. The polymer material may be one of polyvinylidenefluoride (PVDF) and polyurethane (PU), and a color of the polymer material may be white.

The porous colored membrane may have a coating material coated on a surface of a fiber.

The upper waterproof layer and the lower waterproof layer may be a porous colored membrane in a straight shape having a fiber structure with fewer curves than that of the acoustic layer.

The porous membrane of the acoustic layer may be a porous colored membrane of a color formed by electrospinning a polymer material mixed with a colored pigment, or a porous colored membrane of an achromatic color formed by electrospinning a polymer material mixed with a black pigment. At this time, the acoustic layer may be a porous membrane having a fiber structure in a spring shape with more curves than those of the upper waterproof layer and the lower waterproof layer.

Advantageous Effects

According to the present disclosure, the waterproof sound-transmitting sheet for facilitating the vision inspection may interpose and form the acoustic layer between the colored waterproof layers other than white and black, thereby facilitating the vision inspection and improving the water repellency even while making it thin and light.

Further, the waterproof sound-transmitting sheet for facilitating the vision inspection may differently electrospin the physical structures (i.e., fiber structures) of the waterproof layer and the acoustic layer, thereby improving all of the waterproof performance and the acoustic properties.

Further, the waterproof sound-transmitting sheet for facilitating the vision inspection may blend and radiate the polymer material in the state of including the pigment, thereby improving the waterproof while implementing the color other than white and black without increasing the weight.

BRIEF DESCRIPTION OF DRAWINGS

FIGS. 1 to 3 are diagrams for explaining a waterproof sound-transmitting sheet for facilitating a vision inspection according to an exemplary embodiment of the present disclosure.

FIG. 4 is a diagram for explaining a waterproof layer of the waterproof sound-transmitting sheet for facilitating the vision inspection according to the exemplary embodiment of the present disclosure.

FIG. 5 is a diagram for explaining an acoustic layer of the waterproof sound-transmitting sheet for facilitating the vision inspection according to the exemplary embodiment of the present disclosure.

FIG. 6 is a diagram illustrating the result of testing contact angles of the waterproof sound-transmitting sheet for facilitating the vision inspection according to the exemplary embodiment of the present disclosure and a conventional waterproof sound-transmitting sheet.

FIG. 7 is a diagram illustrating the result of testing water repellency of the waterproof sound-transmitting sheet for facilitating the vision inspection according to the exemplary embodiment of the present disclosure and the conventional waterproof sound-transmitting sheet.

DESCRIPTION OF EMBODIMENTS

Hereinafter, the most preferred exemplary embodiments of the present disclosure will be described with reference to the accompanying drawings in order to specifically describe the exemplary embodiments such that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. Further, in describing the present disclosure, when it is determined that the detailed description of the related well-known configuration or function may obscure the gist of the present disclosure, the detailed description thereof will be omitted.

Generally, a waterproof sound-transmitting sheet is formed in white, thereby lowering reading performance for foreign matters or wrinkles upon vision inspection. If the waterproof sound-transmitting sheet is formed in black, the reading performance upon an edge inspection is lowered.

Therefore, a waterproof sound-transmitting sheet according to an exemplary embodiment of the present disclosure is formed to have a color other than white and black to facilitate all of a vision inspection and an edge inspection. At this time, the waterproof sound-transmitting sheet may be formed in an achromatic color other than white and black and for example, formed in gray.

To this end, referring to FIGS. 1 and 2, a waterproof sound-transmitting sheet 100 is configured to include an upper waterproof layer 110, a lower waterproof layer 120 disposed under the upper waterproof layer 110, and an acoustic layer 130 interposed between the upper waterproof layer 110 and the lower waterproof layer 120.

At this time, a conventional waterproof sound-transmitting sheet has a waterproof layer made of a non-porous material, whereas the waterproof sound-transmitting sheet 100 according to the exemplary embodiment of the present disclosure has the waterproof layers (the upper waterproof layer 110 and the lower waterproof layer 120) made of a porous material and is entirely formed with pores.

Here, to facilitate the description, FIGS. 1 and 2 illustrate the upper waterproof layer 110, the lower waterproof layer 120, and the acoustic layer 130 to have the same thicknesses, but they are not limited thereto and the thickness of each layer may be differently formed according to waterproof properties and acoustic properties required.

Further, to facilitate the description, FIGS. 1 and 2 illustrate and describe that the upper waterproof layer 110, the lower waterproof layer 120, and the acoustic layer 130 are clearly separated, but as illustrated in FIG. 3, it may be difficult to clearly separate the upper waterproof layer 110, the lower waterproof layer 120, and the acoustic layer 130 in a real product.

The upper waterproof layer 110 and the lower waterproof layer 120 are composed of porous colored membranes. That is, the upper waterproof layer 110 and the lower waterproof layer 120 are composed of the porous colored membranes having a color other than white and black. Here, the color includes a chromatic color and an achromatic color.

The porous colored membrane implements the color by electrospinning a polymer material to form a white porous membrane and then coating the white porous membrane with a coating material mixed with a colored pigment and a binder. However, if the white porous membrane is coated with the coating material mixed with the pigment and the binder, it is difficult to evenly apply the coating material, thereby lowering waterproof performance and a color implementation rate, and the pigment is added in the coating process, thereby increasing a weight of the membrane.

Therefore, the upper waterproof layer 110 and the lower waterproof layer 120 are composed of the porous colored membrane formed by blending and then electrospinning the pigment and the polymer material.

The porous colored membrane is formed by electrospinning a mixture of the polymer material and the pigment mixed at set rates. At this time, as an example, a rate of adding the pigment to the mixture is about 0.5 wt % or more and 5 wt % or less based on the mixture, and an optimal rate is about 2 wt %.

The porous colored membrane may have a water repellent layer formed on one surface thereof. The water repellent layer is formed by spraying a silicon-based coating material on one surface of the porous colored membrane. At this time, the water repellent layer is formed by a method for coating the coating material only on a surface of a fiber configuring the porous colored membrane other than a surface coating method. Therefore, the porous colored membrane may have some smaller pores but maintain porosity.

Referring to FIG. 4, the upper waterproof layer 110 and the lower waterproof layer 120 are composed of the porous colored membranes having a fiber structure in a stretched straight shape. At this time, the upper waterproof layer 110 and the lower waterproof layer 120 are composed of the porous colored membranes having the pigment included inside the fiber. Here, the straight shape also includes a shape having relatively fewer curves unlike the general dictionary meaning.

The acoustic layer 130 is composed of a porous membrane formed with multiple pores. The acoustic layer 130 is composed of a porous membrane formed by electrospinning a polymer material. At this time, the acoustic layer 130 is composed of the porous membrane formed with the multiple pores for sound-transmission, and composed of a white porous membrane not coated with a mixture of a pigment and a binder.

Referring to FIG. 5, to implement acoustic properties, the acoustic layer 130 is composed of a porous membrane not including a pigment. The acoustic layer 130 is composed of a porous membrane having a fiber structure in a wavy spring shape. Here, the fiber structure of the acoustic layer 130 is formed with relatively more curves than those of the fiber structures of the upper waterproof layer 110 and the lower waterproof layer 120, thereby improving an elastic restoring force. Therefore, the acoustic layer 130 may be formed to have a higher elastic modulus (elastic restoring force) than those of the upper waterproof layer 110 and the lower waterproof layer 120, thereby improving the acoustic properties of the waterproof sound-transmitting sheet 100.

Of course, the acoustic layer 130 may also be composed of a porous colored membrane formed by electrospinning a mixture of a polymer material and a pigment mixed at set rates. At this time, as an example, the acoustic layer 130 is composed of a porous colored membrane formed by electrospinning a polymer material having a white pigment mixed.

Here, as the polymer material used for manufacturing the porous membrane, aromatic polyester such as polyamide, polyimide, polyamideimide, poly(meta-phenyleneisophthalamide), poly sulfone, polyetherketone, polyetherimide, polyethyleneterephthalate, polytrimethyleneterephthalate, or polyethylene naphthalate, polyphosphazenes such as polytetrafluoroethylene, polydiphenoxyphosphazen, poly{bis[2-(2-methoxyethoxy)phosphazenl]}, polyurethane copolymer containing polyurethane and polyetherurethane, cellulose acetate, cellulose acetate butylate, cellulose acetate propionate, or the like may be used. Further, the polymer material may also be formed of polyvinylidenefluoride (PVDF), poly(vinylidenefluoride-co-hexafluoropropylene), perfluoropolymer, polyvinylchloride or polyvinylidene chloride and their copolymers, polyethyleneglycol derivatives containing polyethyleneglycol dialkylether and polyethyleneglycol dialkylester, polyoxide containing poly(oxymethylene-oligo-oxyethylene), polyethylene oxide, and polypropylene oxide, polyvinyl acetate, poly(vinylpyrrolidone-vinylacetate), polystyrene and polystyrene acrylonitrile copolymer, polyacrylonitrile, polyacrylonitrile copolymer containing polyacrylonitrile methylmethacrylate copolymer, polymethylmethacrylate, polymethylmethacrylate copolymer, and their mixture.

Referring to FIG. 6, it may be seen that the waterproof sound-transmitting sheet 100 according to the exemplary embodiment of the present disclosure is formed with a contact angle of about 138 degrees, and the conventional waterproof sound-transmitting sheet is formed with a contact angle of about 133 degrees.

Referring to FIG. 7, it may be seen that a water drop leak occurs at the water pressure resistance of about 0.67 bar in the waterproof sound-transmitting sheet 100 according to the exemplary embodiment of the present disclosure, and a water drop leak occurs at the water pressure resistance of about 0.6 bar in the conventional waterproof sound-transmitting sheet.

As described above, it may be seen that the waterproof sound-transmitting sheet 100 according to the exemplary embodiment of the present disclosure blends and radiates the polymer material in the state of including the pigment to interpose the acoustic layer having the physical structure (i.e., the fiber structure) different from those of the waterproof layers between the upper waterproof layer 110 and the lower waterproof layer 120 formed in color, thereby having the improved waterproof performance in the contact angle test and the water repellence test compared to that of the conventional waterproof sound-transmitting sheet.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. A waterproof sound-transmitting sheet for facilitating a vision inspection comprising:
   an upper waterproof layer composed of a porous membrane;
   a lower waterproof layer composed of the porous membrane and disposed under the upper waterproof layer; and
   an acoustic layer composed of the porous membrane and interposed between the upper waterproof layer and the lower waterproof layer,
   wherein the porous membrane of at least one of the upper waterproof layer and the lower waterproof layer is a porous colored membrane having a color other than white and black, and
   wherein the upper waterproof layer and the lower waterproof layer include a fiber structure in a straight shape, whereas the porous membrane of the acoustic layer includes a fiber structure in a spring shape with more curves than those of the upper waterproof layer and the lower waterproof layer.

2. The waterproof sound-transmitting sheet for facilitating the vision inspection of claim 1,
   wherein the porous colored membrane has an achromatic color other than white and black.

3. The waterproof sound-transmitting sheet for facilitating the vision inspection of claim 1,
   wherein the porous colored membrane is gray.

4. The waterproof sound-transmitting sheet for facilitating the vision inspection of claim 1,
   wherein the porous colored membrane is formed by electrospinning a mixture of a pigment and a polymer material, and a color of the pigment is one of black and white.

5. The waterproof sound-transmitting sheet for facilitating the vision inspection of claim 4,
   wherein a rate of adding the pigment is 0.5 wt % or more and 5 wt % or less based on the mixture.

6. The waterproof sound-transmitting sheet for facilitating the vision inspection of claim 4,
   wherein the polymer material is one of polyvinylidenefluoride (PVDF) and polyurethane (PU), and a color of the polymer material is white.

7. The waterproof sound-transmitting sheet for facilitating the vision inspection of claim 1,
   wherein the porous colored membrane has a coating material coated on a surface of a fiber.

8. The waterproof sound-transmitting sheet for facilitating the vision inspection of claim 1,
   wherein the porous membrane of the acoustic layer is a porous colored membrane of a color formed by electrospinning a polymer material mixed with a colored pigment.

9. The waterproof sound-transmitting sheet for facilitating the vision inspection of claim 1,
   wherein the porous membrane of the acoustic layer is a porous colored membrane of an achromatic color formed by electrospinning a polymer material mixed with a black pigment.

* * * * *